United States Patent [19]

Wittenbrink et al.

[11] Patent Number: 5,750,819
[45] Date of Patent: May 12, 1998

[54] PROCESS FOR HYDROCONVERSION OF PARAFFIN CONTAINING FEEDS

[75] Inventors: Robert J. Wittenbrink; Daniel F. Ryan; William C. Baird, Jr.; Kenneth L. Riley, all of Baton Rouge, La.; Jack W. Johnson, Clinton, N.J.

[73] Assignee: Exxon Research and Engineering Company, Florham Park, N.J.

[21] Appl. No.: 740,972

[22] Filed: Nov. 5, 1996

[51] Int. Cl.$^6$ .................................. C07C 5/13; B01J 23/00
[52] U.S. Cl. .................. 585/734; 585/750; 502/314; 502/318; 502/321; 502/322; 502/331
[58] Field of Search ........................ 585/734, 750; 502/314, 318, 321, 322, 331

[56] References Cited

U.S. PATENT DOCUMENTS 4,923,836  5/1990  Kokayeff et al. ............... 502/331
5,292,989  3/1994  Davis ............................. 585/734

*Primary Examiner*—Glenn Caldarola
*Assistant Examiner*—In Suk Bullock
*Attorney, Agent, or Firm*—Jay Simon

[57] ABSTRACT

Hydroconversion of paraffin containing hydrocarbon feeds is effected over a supported Group VIII and Group VI metal containing catalyst also containing a hydrocracking suppressant such as a Group IB metal, wherein the catalyst is preferably prepared by fixing the Group IB metal on to the support prior to incorporating the Group VI metal on to the support.

13 Claims, No Drawings

5,750,819

1

PROCESS FOR HYDROCONVERSION OF PARAFFIN CONTAINING FEEDS

FIELD OF THE INVENTION

This invention relates to a non-noble metal catalyst for the hydroconversion of paraffin containing feedstocks. More particularly, this invention relates to a catalyst containing cobalt or nickel, a Group VI metal and a Group IB metal, and the use of that catalyst for hydroisomerizing waxy feedstocks, particularly waxy feedstocks produced by a hydrocarbon synthesis reaction, e.g., the Fischer-Tropsch process.

BACKGROUND OF THE INVENTION

The use of supported Group VIII metals in hydroconversion processes is well known. Often, these metals are combined with Group VIA metals, e.g., cobalt and molybdenum, on suitable supports for use in hydroconversion processes. Group VIII noble metals, e.g., platinum and palladium, are efficient hydroconversion catalysts, but these metals are also relatively expensive. Consequently, there exists a desire to find non-noble metals or combinations thereof that can provide activity, selectivity, and activity maintenance equivalent to that of noble metals, thereby significantly lowering catalyst costs.

Unfortunately, however, hydroconversion catalysts comprising Group VIII non-noble metals are prone to undergo undesirable hydrogenolysis. Consequently, the hydrogenolysis, e.g., hydrocracking, produces significant amounts of gaseous products e.g., methane. A catalyst, therefore, that can eliminate or substantially reduce the hydrogenolysis aspect of the process can be more efficient and more economic because of increased yields of desired products and decreased yields of undesirable gaseous products.

SUMMARY OF THE INVENTION

In accordance with this invention, a new bi-functional catalyst for the hydroconversion of hydrocarbons, particularly waxy hydrocarbons from Fischer-Tropsch hydrocarbon synthesis processes, is provided and comprises a non-noble Group VIII metal in conjunction with a Group VI and a Group IB metal supported on an acidic component.

The presence of the Group IB metal is believed to mitigate the excessive hydrogenolysis and cracking activity of Group VIII metals e.g., cobalt which produce excessive amounts of undesirable methane and other $C_4^-$ gases. Thus, the bifunctionality of hydrogenation and isomerization is maximized while hydrogenolysis and cracking activity is minimized. The preferred metals are Group VIII non-noble metals, preferably cobalt, in conjunction with a Group VI metal, preferably molybdenum, and a Group IB metal, preferably copper.

Hydrocracking suppression can be effectively measured by suppressing methane, since hydrocracking most easily occurs through terminal cracking. The process is conducted with hydrocarbon containing feeds at usual hydroisomerization conditions. Generally, the process of this invention will lead to methane yields of less than about 10 wt % based on total 700° F.+ conversion, preferably less than about 6 wt %, more preferably less than about 1 wt %, and still more preferably less than about 0.1 wt %.

Typical hydroisomerization conditions are well known in the literature and can vary widely. For example, broad and preferred ranges for these conditions are shown in the following table:

| CONDITION | BROAD | PREFERRED |
|---|---|---|
| Temperature, °F. (°C.) | 300–900(149–482° C.) | 550–750(288–399° C.) |
| Total pressure, psig | 0–2500 | 300–1200 |
| Hydrogen Treat Rate, SCF/B | 500–5000 | 2000–4000 |
| Hydrogen Consumption Rate, SCF/B | 50–500 | 100–300 |

The catalysts useful in this invention preferably contain an acid function as well as the hydrocracking suppressant. The hydrocracking suppressant may be a Group IB metal, preferably copper, in amounts effective to reduce hydrogenolysis, e.g., at least about 0.1 wt %, preferably about 0.1–10 wt %, more preferably about 0.1–5 wt %, still more preferably about 0.1–2 wt % based on catalyst.

The Group VIII non-noble metals may include cobalt, nickel, or iron, preferably iron, cobalt or nickel, more preferably cobalt. The Group VIII metal is usually present in catalytically effective amounts, that is, ranging from 0.5 to 5 wt %. Preferably, a Group VI metal is incorporated into the catalyst, e.g., molybdenum, in effective catalytic amounts of about 1–20 wt %.

The acid functionality can be furnished by a support with which the catalytic metal or metals can be incorporated or deposited by well known methods. The support can be any refractory oxide or mixture of refractory oxides or zeolites or mixtures thereof. Preferred supports include silica, alumina, silica-alumina, silica-alumina-phosphates, titania, zirconia, vanadia and other Group III, IV, V or VI oxides, as well as Y sieves, such as ultra stable Y sieves. Preferred supports include alumina and amorphous silica-alumina, more preferably amorphous silica-alumina where the silica concentration of the bulk support is less than about 50 wt %, preferably less than about 35 wt %, more preferably 15–30 wt %. When alumina is used as the support, small amounts of chlorine or fluorine may be incorporated into the support to provide the acid functionality.

A preferred supported catalyst has surface areas in the range of about 180–400 m²/gm, preferably 230–350 m²/gm, and a pore volume of less than 1.0 ml/gm, preferably 0.3 to less than 1.0 ml/gm, a bulk density of about 0. 5–1.0 g/ml, and a side crushing strength of about 0.8 to 3.5 kg/mm.

The preparation of preferred amorphous silica-alumina microspheres for use as supports is described in Ryland, Lloyd B., Tamele, M. W., and Wilson, J. N., Cracking Catalysts, Catalysis; Volume VII, Ed. Paul H. Emmett, Reinhold Publishing Corporation, New York, 1960.

During hydroisomerization, the 700° F.+ conversion to 700° F.- on a once through basis ranges from about 20–80%, preferably 30–70%, more preferably about 40–60%; and essentially all olefins and oxygenated products are hydrogenated.

The feed can be any hydrocarbon containing material having a final boiling point of up to about 1050° F. (566° C.). A particularly preferred feed is a $C_5+$ material derived from a hydrocarbon synthesis, e.g., Fischer-Tropsch process, preferably a non-shifting process as exemplified in U.S. Pat. No. 4,568,663 and EP 450860.

The feed materials for hydroisomerization are typically comprised of waxy feeds, e.g., $C_5+$, a portion of which and preferably at least about 50 wt % of which boils above about 350° F. (177° C.), preferably above about 550° F. (288° C.), and most preferably contain substantially normal paraffins obtained from a Fischer-Tropsch process or as obtained from slack waxes. Slack waxes are the by-products of lube dewaxing operations where a diluent such as propane or a ketone (e.g., methylethyl ketone, methylisobutyl ketone) or other diluent is employed to promote wax crystal growth, the wax being removed from the lube base oil by filtration or other suitable means. The slack waxes are generally paraffinic in nature, boil above about 600° F. (315° C.), preferably in the range of 600° F. to 1050° F. (315°–566° C.) and may contain from about 1 to about 35 wt % oil. Waxes with lower oil contents, e.g., 5–20 wt % are preferred; however, waxy distillates or raffinates containing 5–45% wax may also be used as feeds. Slack waxes are usually freed of polynuclear aromatics and heteroatom compounds by techniques known in the art; e.g., mild hydrotreating as described in U.S. Pat. No. 4,900,707, which also reduces sulfur and nitrogen levels. Feeds which contain high levels of sulfur, e.g., >30 ppm sulfur, may also be used as the catalyst described here is sulfur tolerant. In addition, feeds such as gas field condensates may be used as feeds or other petroleum derived feeds with high sulfur levels that require hydroisomerization to improve its properties.

A distillation showing the fractional make up (±b 10 wt % for each fraction) for a typical Fischer-Tropsch process feed stock follows:

| Boiling Temperature Ranges | Wt % of Fraction |
| --- | --- |
| IBP-320° F. (160° C.) | 13 |
| 320–500° F. (160–260° C.) | 23 |
| 500–700° F. (260–371° C.) | 19 |
| 700–1050° F. (371–566° C.) | 34 |
| 1050° F.+ (566° C.+) | 11 |
| Total | 100 |

Feeds derived from Fischer-Tropsch processes are essentially free of sulfur but may have some oxygenated products incorporated therein.

The feed may be treated or untreated as regarding the removal of hetero-atoms containing compounds (e.g., sulfur and oxygen containing compounds). However, when the feed is treated, essentially all of the sulfur and oxygen should be reduced to sulfur levels of less than about 10 wppm, preferably less than 2 ppm sulfur, more preferably less than 1 wppm sulfur, and oxygen levels of less than about 10 wppm. Such feeds are most preferably characterized by the substantial absence of sulfur and oxygen. Hydrotreating is effected by any of the well known hydrotreating (e.g., hydrodesulfurization) processes known in the literature.

The catalyst can be prepared by any well known method, e.g., impregnation with an aqueous salt, incipient wetness technique, followed by drying at about 125°–150° C. for 1–24 hours, calcination at about 300°–500° C. for about 1–6 followed by reduction with a hydrogen or a hydrogen containing gas.

In the preparation of bi-metallic catalysts, such as catalysts containing cobalt and molybdenum, the order in which the metals are deposited upon, or composited with, or incorporated into, the support does not generally affect the performance of the catalyst. Thus, whether cobalt is added to the support before the molybdenum is added to the support, or if the cobalt and molybdenum are added to the support simultaneously, e.g., co-impregnation, makes little difference in catalyst performance.

Nevertheless, the order of metal addition for the trimetallic catalysts described herein can affect the hydroisomerization performance of the catalyst insofar as hydrogenolysis and conversion to branched species is concerned. Thus, improved catalytic performance occurs when the Group IB metal, e.g., copper, the hydrogenolysis suppressant, is fixed onto the support prior to incorporation of the Group VI metal, e.g., molybdenum. Fixing the metal onto the support, for purposes of this specification, means that the metal, incorporated as a decomposable compound, preferably a decomposable metal salt, has been converted to the metal oxide, usually and typically by calcination at elevated temperatures in the presence of an oxygen containing gas, e.g., air, for a time sufficient to convert substantially all and preferably all, of the metal compound to the oxide.

The cobalt may be incorporated or fixed onto the support either before, after, and preferably simultaneously, e.g., co-impregnation, with the copper, so long as the molybdenum is incorporated and fixed onto the support after fixing of the copper on to the support.

The reason for the difference in catalyst performance is not well understood at this time; suffice to say that the performance difference does exist.

Upon fixing of the molybdenum onto the support, i.e., after the last calcination, the metal oxides are activated by treating the composited support with hydrogen or a hydrogen containing gas, which effectively reduces the metal to its elemental form. Reduction need only be for that period of time sufficient to produce an effective hydroisomerization catalyst with hydrogenolysis suppression activity. Generally, at least about 50% of the metal oxides are reduced, preferably at least about 80%, more preferably at least about 90% reduction is effected.

The following examples will serve to illustrate, but not limit this invention.

EXAMPLE 1

A commercial Co—Mo catalyst on a $SiO_2$—$Al_2O_3$ support containing 20–30 wt % bulk silica was reduced at 370° C. for 3 hours in hydrogen. The catalyst was used to hydroisomerize n-heptane as a model compound representing the more refractory paraffins present in Fischer-Tropsch liquids. The catalyst contains 3.2 wt. % CoO, 15.2 wt. % $MoO_3$, and 15.5 wt. % $SiO_2$. The balance of the material is $Al_2O_3$ with some impurities. Surface area is 266 m2/g, pore volume (measured by Hg porosimetry) is 0.63 ml/g, and the compacted bulk density is 0.67 g/ml. The results of the isomerization test are presented in Table 1.

EXAMPLE 2

The Co—Mo catalyst of Example 1 was impregnated with an aqueous solution of copper nitrate to introduce 0.5 wt % Cu. A description of the preparation follows. 11.582 g of Cupric Nitrate (Fisher Lot #951352) was dissolved in deionized water to make up a total volume of 480 mL. A rotary impregnation vessel was then used to impregnate the Copper Nitrate solution onto 615.0 g of the commercial Co—Mo catalyst described in Example 1. Since this catalyst had a non-volatile content of 98.6 wt. %, this amount of catalyst represented 606.4 g dry solids. The wet impregnated material was air dried overnight and then dried in a forced air oven for 4 hours at 120° C. The dried catalyst was then calcined in a muffle furnace with flowing air for 2 hours at 427° C.

The catalyst was calcined in air at 370° C. and reduced in hydrogen at 370° C. for 3 hours. The Co—Mo—Cu catalyst was used to hydroisomerize n-heptane. The results are presented in Table 1.

The catalyst of Example 1, while active for hydroisomerization, has extremely high hydrocracking activity as evidenced by very high methane and n-butane yields and the destruction of normal and iso-heptanes. Liquid yield is decreased to a value <70 wt %.

The catalyst of this invention, Co—Mo—Cu, the catalyst of Example 2, is the preferred hydroisomerization catalyst on the basis of higher selectivity to isomerized product and substantially decreased hydrocracking activity. The yield of liquid product exceeds 92 wt %, and the formation of iso-heptanes is roughly 35% greater than that of Example 1.

TABLE 1

ISOMERIZATION OF HEPTANE WITH
Co—Mo AND Co—Mo—Cu CATALYSTS n-Heptane, 425° C., 100 psig, 5 W/H/W, $H_2$/Oil = 6

| | EXAMPLE | |
|---|---|---|
| | 1 | 2 |
| | Catalyst | |
| | Co—Mo | Co—Mo/Cu |
| $C_1$ | 17.7 | 7.7 |
| i-$C_4$ | 0.9 | 0.9 |
| n-$C_4$ | 8.8 | 5.1 |
| n-$C_7$ | 27.5 | 43.7 |
| 2-Me-Hex | 3.6 | 7.4 |
| 3-Me-Hex | 4.6 | 9.1 |
| i-$C_7$'s | 8.2 | 16.5 |

To determine the effect of order of metal addition or the performance of Co—Cu—Mo catalysts, several catalysts were prepared.

EXAMPLE 3

This example describes a catalyst where the Cu and Co were added to the carrier before Mo addition: 1.910 g of Cupric Nitrate (Fisher Lot #951352) and 12.840 g of Cobalt Nitrate (Mallinckrodt Lot #3420 KEMD) were added to an Erlenmeyer flask and dissolved in deionized water to a total volume of 78.6 ml. To the Erlenmeyer flask was added 85.474 g of $SiO_2$—$Al_2O_3$ support (with a dry solids content of 95.0 wt. %). The flask was shaken until all the particles were wet. The carrier contained 19.0 wt. % $SiO_2$ and the balance $Al_2O_3$. The surface area was 326 $m^2$/g and the pore volume (measured by Hg porosimetry) was 0.77 ml/g. After shaking the flask to make sure all the particles were wet, the wet material was dried in air overnight. The material was then dried in a forced air oven for 4 hours at 120° C. and then calcined in a muffle furnace in flowing air for 2 hours at 427° C.

17.803 g of Ammonium Heptamolybdate (Mallinckrodt Lot #3420 KPAM) was added to 13.47 g of Ammonium Hydroxide (Mallinckrodt 30 wt. % $NH_3$ Lot #1177 KPLA) in an Erlenmeyer flask. To this mixture was added deionized water to a total volume of 74.4 ml. The Cu—Co containing carrier was then added to this solution and the flask shaken until all the particles were wet. This material was then dried in air overnight and then dried in a forced air oven for 4 hours at 120° C. The Cu—Co—Mo catalyst was then calcined in a muffle furnace with flowing air for 2 hours at 427° C.

EXAMPLE 4

This example describes a catalyst with only Cu and Co. 1.910 g of Cupric Nitrate (Fisher Lot #951352) and 12.840 g of Cobalt Nitrate (Mallinckrodt Lot #4544 KEMD) were added to an Erlenmeyer flask and dissolved in deionized water to a total volume of 78.6 ml. To the Erlenmeyer flask was added 85.474 g of $SiO_2$—$Al_2O_3$ support (with a dry solids content of 95.0 wt. %). The flask was shaken until all the particles were wet. The carrier contained 19.0 wt. % $SiO_2$ and the balance $Al_2O_3$. The surface area was 326 $m^2$/g and the pore volume (measured by Hg porosimetry) was 0.77 ml/g. After shaking the flask to make sure all the particles were wet, the wet material was dried in air overnight. The material was then dried in a forced air oven for 4 hours at 120° C. and then calcined in a muffle furnace in flowing air for 2 hours at 427° C.

EXAMPLE 5

This example describes a catalyst where the Mo was added first to the carrier before the Co and Cu. 18.902 g of Ammonium Heptamolybdate (Mallinckrodt Lot 3420 KPAM) was placed in an Erlenmeyer flask and dissolved with deionized water to a total volume of 80.7 ml. To the Erlenmeyer flask was added 84.06 g of $SiO_2$—$Al_2O_3$ support (with a dry solids content of 96.6 wt. %). The flask was shaken until all the particles were wet. The carrier contained 19.0 wt. % $SiO_2$ and the balance $Al_2O_3$. The surface area was 326 m2/g and the pore volume (measured by Hg porosimetry) was 0.77 ml/g. This material was then dried in air overnight and then dried in a forced air oven for 4 hours at 120° C. The Mo-containing carrier was then calcined in a muffle furnace with flowing air for 2 hours at 427° C.

1.812 g of Cupric Nitrate (Fisher Lot #951352) and 12.172 g of Cobalt Nitrate (Mallinckrodt Lot #4544 KEMD) were placed in an Erlenmeyer flask and dissolved into deionized water to a total volume of 69.3 ml. To the Erlenmeyer flask was added 91.12 g of the Mo-containing carrier. The flask was shaken until all the particles were wet. After shaking the flask to make sure all the particles were wet, the wet material was dried in air overnight. The material was then dried in a forced air oven for 4 hours at 120° C. and then calcined in a muffle furnace in flowing air for 2 hours at 427° C.

EXAMPLE 6

This example describes a catalyst where the Cu was added in a post-treat after the Mo and Co had each been added to the carrier. 18.902 g of Ammonium Heptamolybdate (Mallinckrodt Lot #3420 KPAM) was placed in an Erlenmeyer flask and dissolved with deionized water to a total volume of 80.7 ml. The 19.0 wt. % $SiO_2$/$Al_2O_3$ carrier (with a dry solids content of 96.6 wt%) described in Example 3 was then added to this solution and the flask shaken until all the particles were wet. This material was then dried in air overnight and then dried in a forced air oven for 4 hours at 120° C. The Mo-containing carrier was then calcined in a muffle furnace with flowing air for 2 hours at 427° C.

12.172 g of Cobalt Nitrate (Mallinckrodt Lot #4544 KEMD) was placed in an Erlenmeyer flask and dissolved in deionized water to a total volume of 69.2 ml. To the Erlenmeyer flask was added 91.04 g of the Mo-containing carrier. The flask was shaken until all the particles were wet. After shaking the flask to make sure all the particles were wet, the wet material was dried in air overnight. The material was then dried in a forced air oven for 4 hours at 120° C. and then calcined in a muffle furnace in flowing air for 2 hours at 427° C.

1.472 g of Cupric Nitrate (Fisher Lot #951352) was placed in an Erlenmeyer flask and dissolved in deionized water to a total volume of 61.6 ml. To the Erlenmeyer flask was added 77.0 g of the Mo-Co-containing carrier. The flask was shaken until all the particles were wet. After shaking the flask to make sure all the particles were wet, the wet material was dried in air overnight. The material was then dried in a forced air oven for 4 hours at 120° C. and then calcined in a muffle furnace in flowing air for 2 hours at 427° C.

The catalysts from Examples 3–6 representing different methods of synthesis of the catalyst of this invention were tested in heptane isomerization, and the results are presented in Table 2.

TABLE 2

ISOMERIZATION OF HEPTANE WITH Co—Mo—Cu CATALYSTS n-Heptane, 425° C., 100 psig, 5 W/H/W, $H_2$/Oil =6

| | EXAMPLE | | | |
|---|---|---|---|---|
| | 3 | 4 | 5 | 6 |
| | Catalyst | | | |
| | Cu—Co/Mo | Cu—Co | Mo/Co—Cu | Mo/Co/Cu |
| $C_1$ | 6.3 | 2.9 | 10.1 | 12.1 |
| i-$C_4$ | 0.8 | 0.3 | 0.7 | 0.8 |
| n-$C_4$ | 5.2 | 0.8 | 4.7 | 5.1 |
| n-$C_7$ | 43.7 | 82.2 | 44.7 | 42.2 |
| 2-Me-Hex | 8.0 | 3.0 | 6.6 | 6.0 |
| 3-Me-Hex | 9.8 | 4.2 | 8.2 | 7.4 |
| i-$C_7$'s | 17.8 | 7.2 | 14.7 | 13.4 |

Example 3 representing the preferred synthesis method provides an isomerization catalyst with low cracking activity coupled with high isomerization activity as indicated by the methane and iso-heptane yields. Example 4 illustrates that Mo is an essential catalyst ingredient. In the absence of Mo the catalyst has poor activity of any type. Examples 5 and 6 demonstrate that catalyst synthesis based on the initial deposition of Mo followed by the addition of Cu and Co produces inferior catalysts characterized by high methane yields indicative of high cracking activity and decreased yields of the desired iso-heptanes.

What is claimed is:

1. A process for isomerizing a feed containing $C_5$+ paraffins comprising passing the feed, at effective isomerization conditions of temperatures and pressures over a non-noble metal, supported catalyst in the presence of hydrogen, the catalyst comprising a Group VIII metal, a Group VI metal, and an effective amount of a Group IB metal as a hydrogenolysis suppressant and wherein the Group IB metal is fixed on the support prior to incorporation of the Group VI metal on the support.

2. The process of claim 1 wherein the feed contains paraffins boiling above about 350° F.

3. The process of claim 2 wherein the Group VIII metal is cobalt, the Group VI metal is molybdenum, the Group IB metal is copper, and the support is a refractory oxide.

4. The process of claim 3 wherein conversion of the feed ranges from about 20–80%.

5. The process of claim 4 wherein the methane yield is less than 10 wt %.

6. The process of claim 3 wherein cobalt and copper are simultaneously incorporated on the support.

7. The process of claim 3 wherein the support is silica-alumina with a silica content of less than about 50 wt %.

8. The process of claim 3 wherein the feed is substantially sulfur free.

9. The process of claim 8 wherein the feed is derived from a Fischer-Tropsch hydrocarbon synthesis process.

10. The process of claim 3 wherein cobalt is present on the catalyst in an amount of 0.05–5 wt %.

11. The process of claim 10 wherein molybdenum is present on the catalyst in an amount of 1–20 wt %.

12. The process of claim 11 wherein copper is present on the catalyst in an amount of at least about 0.1 wt %.

13. The process of claim 12 wherein copper is present on the catalyst in an amount of 0.1–5 wt %.

* * * * *